Patented Sept. 28, 1926.

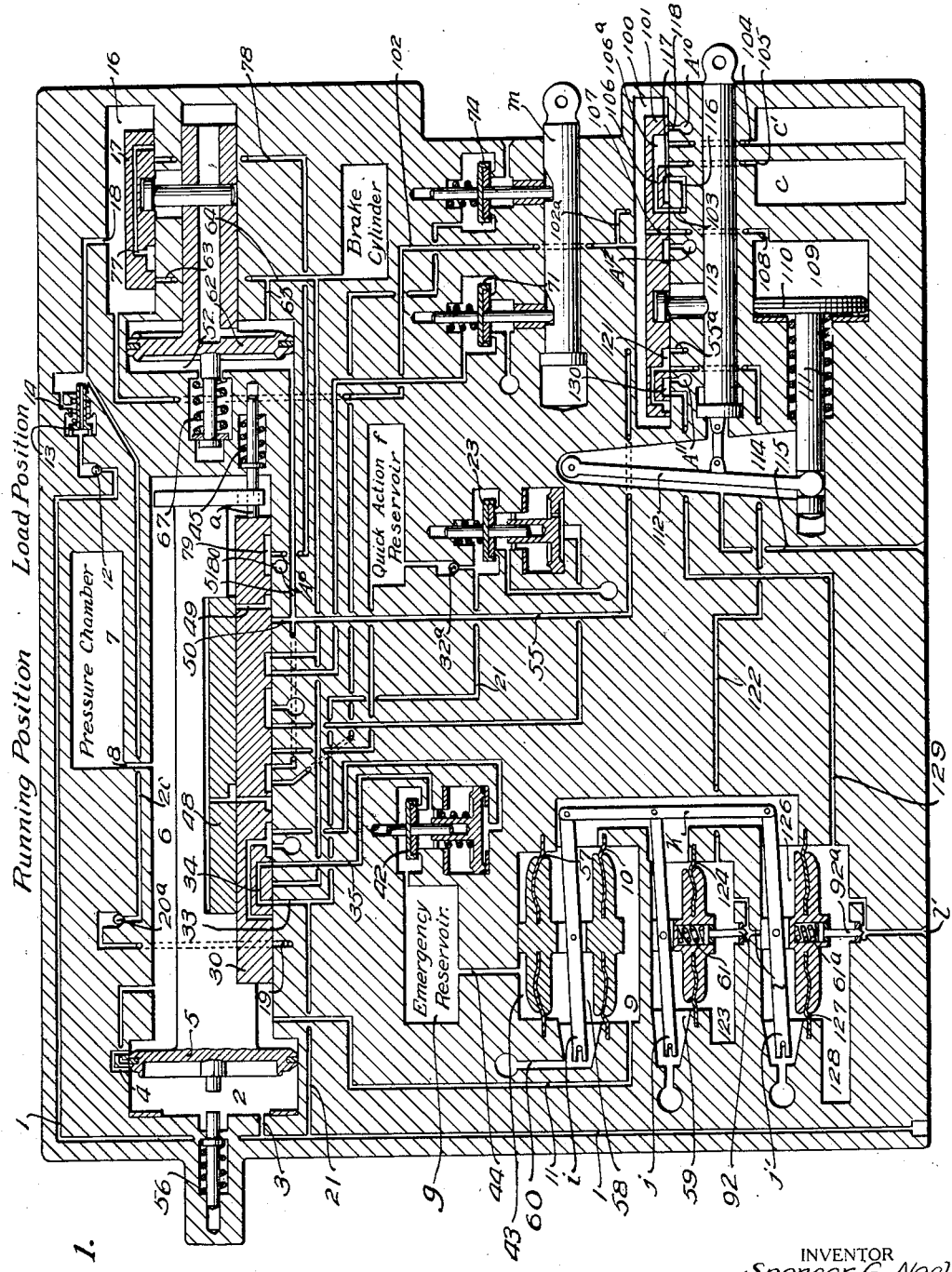

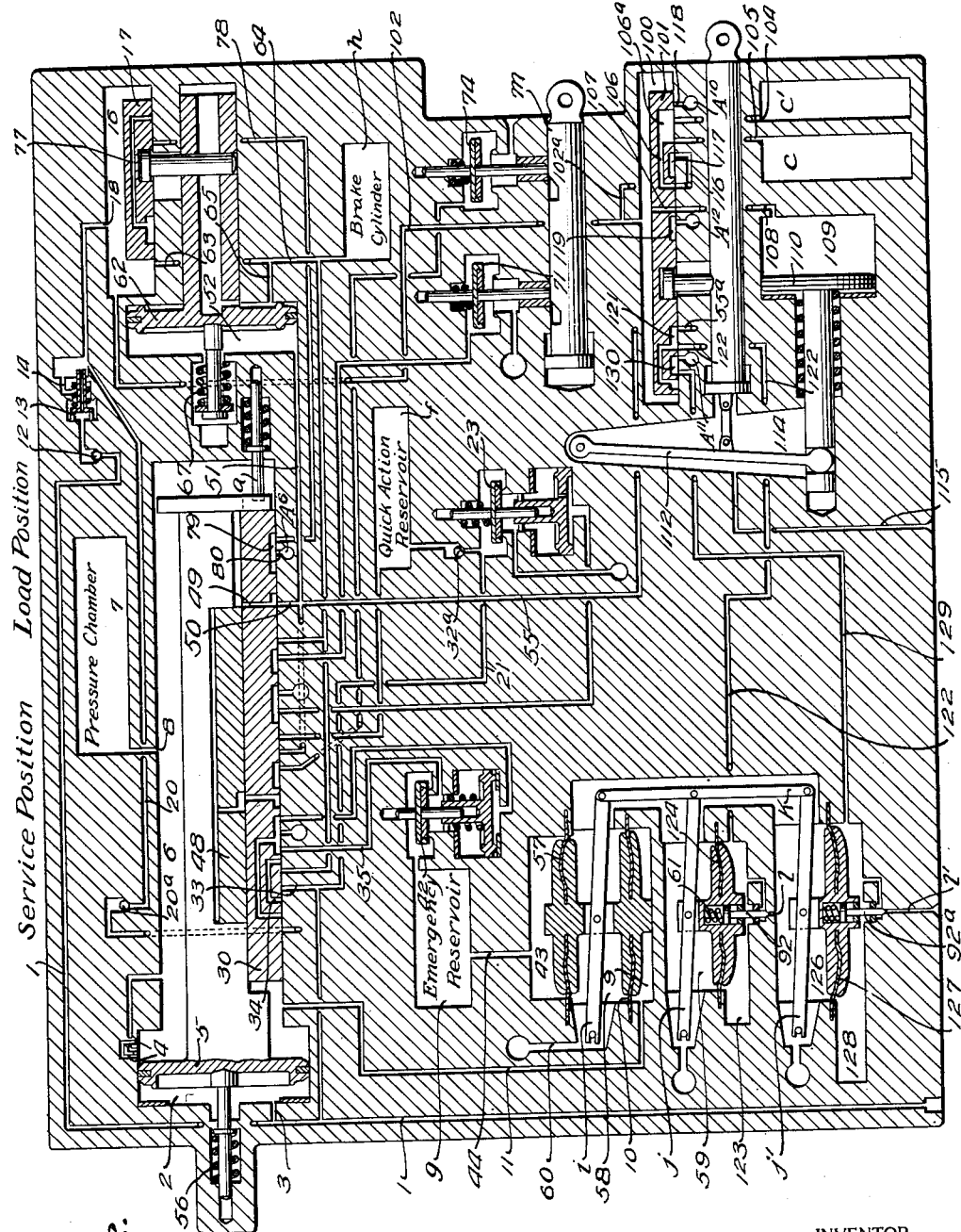

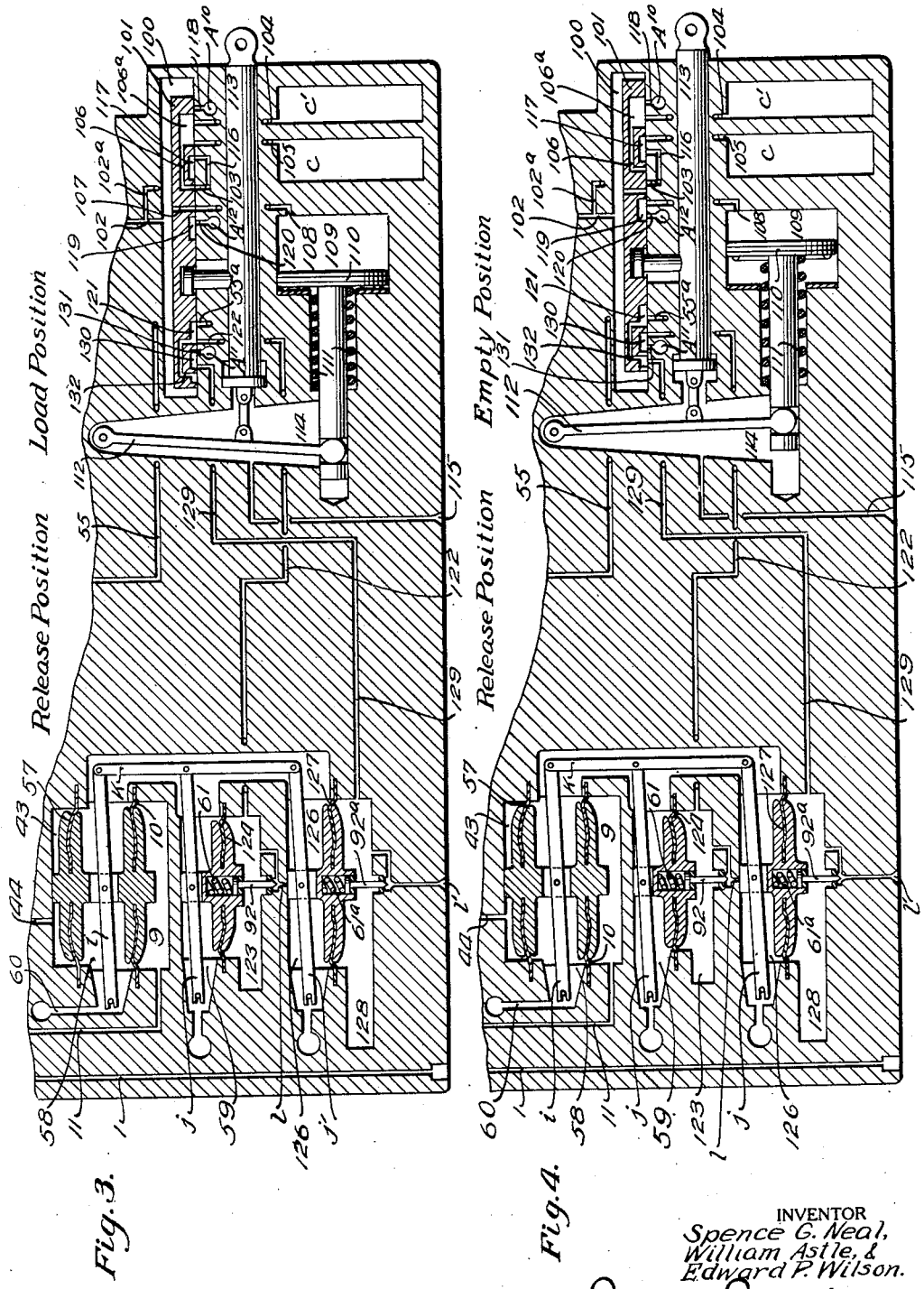

1,601,581

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

EMPTY AND LOAD AIR-BRAKE APPARATUS.

Application filed December 27, 1924, Serial No. 758,387. Renewed July 8, 1926.

This invention relates to improvements in that type of triple valves which operate upon a reduction of brake pipe pressure to connect a pressure chamber to a control chamber to thereby build up in the control chamber a pressure equal to the desired brake cylinder pressure, said desired brake cylinder pressure being dependent upon and at a predetermined ratio to the pressure reduction in the brake pipe. The pressure in the control chamber moves an application valve into position to connect a service reservoir to the brake cylinder and to the brake cylinder chamber. When the brake cylinder pressure and the pressure in the brake cylinder chamber have been built up to an equality with the pressure previously established in the control chamber the application valve is moved back to lap position.

One of the principal objects of this invention is to so improve the type of triple valve herein described, as to provide an empty and load brake of very simple construction and which is operated by varying the ratio of brake cylinder pressure developed upon a given brake pipe reduction. When adjusted for light or empty car braking the ratio of brake cylinder pressure built up from a given brake pipe reduction will be low, for instance, one or one and a half to one; when, however, the brake is adjusted for load braking the ratio of brake cylinder pressure built up for a given brake pipe reduction will be high, for instance three or three and one half to one. With an empty and load air brake apparatus operating on this principle a single brake cylinder is used in which a low pressure is developed for empty car braking and a high pressure is developed for loaded car braking the same degree of brake pipe reduction producing the high or the low pressure in the brake cylinder according to the adjustment of the triple valve.

Another object of the invention is to provide an empty and load brake which in both its empty car braking position and in its loaded car braking position will work in harmony with the present standard form of air brake apparatus.

There are many other important objects and advantages of the invention, all of which will fully hereinafter appear.

In the drawings the invention is shown as applied to a triple valve constructed in accordance with the copending application, Serial No. 754,110, filed December 5, 1924. It will be understood, however, that the invention may be applied to any suitable form of triple valve having the necessary operating characteristics.

In the drawings:—

Fig. 1 is a diagrammatic view of a triple valve constructed in accordance with this invention, the parts being shown with the reservoirs fully charged and the parts in running position, the change-over valve being in load braking position, the release governing valve being in graduated release position;

Fig. 2 a view similar to Fig. 1 showing the parts in service position, the release governing valve being in quick release position;

Fig. 3 a partial diagrammatic view in release position, the change-over valve being in load braking position; and Fig. 4 a view similar to Fig. 3, the change-over valve being in empty car braking position.

In order to simplify the description of the triple valve, the various parts and the ports and passages will not be specifically described except in connection with the various operations of the triple valve.

Charging the system.

When charging the system air passes from the brake pipe through passages 1 and 3 to the main brake pipe chamber 2 in which is arranged the main operating piston 5. Connected to the chamber 2 is a main slide valve chamber 6. The piston 5 carries a piston stem which extends longitudinally through the valve chamber 6 and is suitably guided therein. Chamber 6 is separated from chamber 2 by the piston 5. The piston stem is operatively connected to a graduating valve 48 and to a main slide valve 30, the main slide valve moving over a seat formed on the lower wall of the valve chamber 6 and the graduating valve operating on top of the main slide valve. There is a lost motion connection between the main slide valve and the piston stem and a direct positive connection between the graduating valve and the piston stem. The increase in pressure in chamber 2 forces the piston 5 inwardly and carries the main slide valve into engagement with a normal charging stop *a*. This stop is held in its normal position by a spring 45 and yieldingly holds the valves and the main piston 5 in normal charging position. When the main operating piston is in normal charging position chamber 9 is in communication with chamber 6 through a by-pass port 4 so that chamber 6 will be charged through said by-pass. The pressure chamber 7 is in direct open communication with chamber 6 through port 8 and will be charged from chamber 6. The valve chamber 6 is in direct open communication with an actuating chamber 9 through passage 11 so that the actuating chamber will be charged from chamber 6. The upper wall of the actuating chamber is formed by an actuating diaphragm 10.

The service reservoir is divided into two sections *c* and *c'* and both of these sections are charged from the brake pipe passage 1. The increasing pressure in brake pipe passage 1 will flow past check valve 12, around the check valve 13 and down through passage 14 into passage 18. Passage 18 leads into application valve chamber 16 and this chamber is directly connected to the change-over valve chamber 100 through passage 102. A change-over valve 101 is arranged in chamber 100. A passage 102$^a$ connects passage 102 to a port 103 in the seat of the change-over valve. With the valve 101 in load braking position, as shown in Fig. 1, port 103 is connected by passage 106 and cavity 106$^a$ in the change-over valve to passages 104 and 105. Passage 104 connects with service reservoir section C' and passage 105 connects with service reservoir section C, and both sections operate as one volume.

The change-over valve 101 is provided with a port 107 which permits air to flow from chamber 100 to passage 108 and thence to piston chamber 109. The air pressure in this chamber holds piston 110 pressed inwardly to its seat against the resistance of spring 111. The piston 110 is provided with a stem which is loosely connected to the lower end of a lever 112, said lever being pivoted at its upper end in chamber 114. The lever 112 is connected to the change-over valve stem 113, so that when the piston 110 is forced inwardly the change-over valve stem will be held in its inner load braking position, as shown in Fig. 1. The outer end of the stem 113 projects beyond the triple valve casing and may be manually operated from empty car braking position to load braking position. Chamber 114 is vented to atmosphere at all times through passage 115 so that the inner or spring side of the piston 110 is exposed to atmospheric pressure only.

A passage 20 leads from passage 18 direct to a port 19 in the seat of the main slide valve. This port, in the emergency position of the main slide valve, will be connected to a passage leading to the emergency reservoir. At all other times port 19 is closed by the main slide valve. As the service reservoir is always in open communication with the application valve chamber 16 and the passage 18, service reservoir air will always be present at port 19. A back pressure check valve 20$^a$ is arranged in the passage 20 to prevent the flow of emergency reservoir air back to the valve chamber 16 in emergency applications of the brakes.

Air flows from passage 1 through passage 21 to the quick action reservoir *f*. Air also flows from passage 21 through passage 33, port 34 of the main slide valve and passage 35 to the emergency reservoir *g*. The emergency reservoir valve 42 and the brake pipe vent valve 23 operate as fully described in the co-pending application, Serial No. 754,110 hereinbefore mentioned and need not be specifically described herein. The emergency reservoir is in direct and open communication through passage 44 with an emergency reservoir chamber 43, the lower wall of which is formed by an emergency diaphragm 57. The emergency diaphragm is slightly smaller than the actuating diaphragm 10 so that there will be a slight bias upwardly when there is an equalization of pressures in chambers 43 and 9. When the pressures in the service reservoir, quick action reservoir and emergency reservoir have equalized with the brake pipe pressure, valves 12, 32$^a$ and 42 return to their seats to prevent a back flow of air from said reservoirs to the brake pipe when a brake pipe reduction is made.

With the change-over valve 101 in empty car braking position (as shown in Fig. 4) section C' of the service reservoir will be vented to atmosphere through port 104, cavity 106$^a$ of the change-over valve, port 118 and atmospheric port A$^{10}$. Section C of the service reservoir will be charged through passage 102$^a$, port and passage 103, branch passage 116, cavity 117 of the change-over valve, and port and passage 105. In all other respects the charging is precisely as hereinbefore described.

The retarded re-charging and retarded release operations of the triple valve are fully described in the aforesaid pending application and need not be specifically described herein.

*Running position.*

The running position of the parts of the triple valve is illustrated in Fig. 1. In this running position the system, including all of the reservoirs and the brake pipe, is fully charged and there is an equalization of pressures in chambers 9 and 43 and the diaphragms 57 and 10 will be approximately balanced with a slight bias upward due to the fact that the emergency diaphragm 57 is slightly smaller than the actuating diaphragm 10. This slight upward bias will hold open the two exhaust valves which are connected to the diaphragms as hereinafter described.

*Service application position (Fig. 2).*

*Load Braking.*—To obtain a service application of the brakes a service brake pipe reduction is made in the usual manner through the engineer's brake valve. This service reduction of brake pipe pressure is registered directly in the main brake pipe chamber 2. The pressure in chamber 6 forces the piston 5 toward the left, as viewed in the drawings, until it is stopped by the yielding spring-pressed plunger which arrests the piston in service application position. The piston 5 carries with it the main slide valve 30 and the graduating valve 48. The movement of the graduating valve and the main slide valve opens port 49 through the main slide valve, and the movement of the main slide valve places the application port 49 in register with a port and passage 50. Passage 50 is connected by a passage 51 to a brake cylinder control chamber 52. Chamber 52 is in connection through passages 51 and 55 with a port 55ª in the seat of the change-over valve. The change-over valve is formed with a cavity 121 which, in the load position of said valve, connects port 55ª with port and passage 122 which leads to a pressure governing chamber 123 below a diaphragm 124. This diaphragm is smaller in area than the actuating diaphragm 10, and the chamber 123 is extended slightly to give it the desired capacity. Air will flow from chamber 6 directly to the brake cylinder control chamber 52 and through passage 55 and the change-over valve to the pressure governing chamber 123. Pressure will continue to build up in these two chambers until the pressure in chamber 6 is dropped slightly below the reduced brake pipe pressure. Brake pipe pressure in chamber 2 will prevail and the graduating valve will be moved to lap position to close port 49.

The combined volumes of chambers 52 and 123 is so proportioned to the volume of pressure chamber 7 and valve chamber 6 as to give a desired ratio between the brake pipe reduction and the pressure in the control chamber 52 and in the pressure governing chamber 123. The chamber 123 is the load-braking pressure-governing chamber and is comparatively small so that a high pressure will be built up therein. For example, the volumes of these various reservoirs and chambers may be so proportioned that a ten pound brake pipe pressure reduction will result in a build up of a thirty pound pressure in chambers 52 and 123 before the graduating valve is moved to lap position. It will, of course, be understood that the ratio of pressure developed in the chambers 52 and 123 may be varied to any desired extent.

The size of passage 122 is so proportioned that the rate of pressure reduction in chamber 6 is approximately equal to the rate of reduction in chamber 2 when a service brake pipe reduction is made. This approximately equal rate of pressure drop plus the resistance of spring 56 causes the piston 5 and the valve 30 to stop in service position.

The pressure build-up in the pressure control chamber 52 forces the piston 62 to the right, as viewed in the drawings. The application valve 17 is connected to the piston stem of the piston 62 and moves with it to application position. The piston in application position is stopped by the inner wall of the control chamber. When the application valve is in application position port 63 is uncovered and service reservoir air from the two sections of said reservoir will flow from chamber 16 through port and passage 63 to the brake cylinder $h$. The brake cylinder chamber 66 on the right hand side of the piston 62 is in direct communication with the brake cylinder passage 64 through passage 65 so that brake cylinder pressure will be exerted on the piston 62 in opposition to the pressure in the control chamber 52. When the piston 62 is moved to application position the lap spring 67 is compressed. When brake cylinder pressure equals the pressure in the control chamber 52, piston 62 and the application valve will be moved to lap position by the lap spring 67 and port 63 will be closed. The brake cylinder pressure balanced against the pressure in the control chamber 52 is the determining factor in lapping the application valve 17. Brake cylinder pressure will therefore be built up in the brake cylinder without regard to brake cylinder piston travel.

The emergency diaphragm 57 is slightly smaller in area than the actuating diaphragm 10. Between these two diaphragms is formed a chamber 58 that is open to atmosphere at all times through passage 60. The chamber 59 above the pressure governing diaphragm 124 is in open communication with the chamber 58 and with the atmosphere through passage 60. The diaphragms 57 and 10 are rigidly connected together by a central stem and the diaphragm 124 is connected to the diaphragms 57 and 10 by levers $i$ and $j$ and a link $k$, in such manner that the three diaphragms move together and move equal distances. The area of the diaphragm 124 is smaller than the diaphragms 57 and 10, and is so proportioned to the areas of the diaphragms 57 and 10 as to give the same pressure ratio as exists between the volumes of chambers 7 and 6 and chambers 52 and 123. For example, the build-up pressure in chamber 123 below the diaphragm 124 must be sufficient to assist the reduced pressure in chamber 9 to balance the undisturbed emergency reservoir pressure in chamber 43. If a pressure reduction of twenty pounds from seventy pounds in chamber 7 results in a pressure of fifty pounds in chambers 52 and 123, the diaphragms must be so proportioned that a pressure of fifty pounds in chamber 123 plus the reduced pressure in chamber 9 (which will be fifty pounds), must balance the undisturbed emergency reservoir pressure of seventy pounds in chamber 43. It is therefore manifest that the ratio of pressure built up in chamber 123 to the reduction registered in chamber 9 due to the brake pipe reduction will be precisely the same ratio as the pressure built up in chamber 123 is to the brake pipe reduction in chamber 2.

If the pressure built up in chamber 123 from a given brake pipe reduction plus the upward force exerted on the diaphragm 10 by the reduced pressure in chamber 9 is less than the downward force exerted on the diaphragm 57 by the undisturbed emergency reservoir pressure in chamber 43 the diaphragms will move downwardly. This downward movement of the diaphragms, because of the link and lever connections, will compress the spring 61 and hold valve 92 more firmly to its seat. If the sum of the upward forces on diaphragms 10 and 124 should be greater than the downward forces on diaphragm 57 the diaphragms would move upwardly lifting the valve 92 from its seat and opening the exhaust port $l$ and thereby permit the escape of air from chamber 123 and from the control chamber 52. Air will continue to exhaust from said chamber until the pressure in chamber 123 is sufficiently reduced to permit the pressure in chamber 43 to move the diaphragms downwardly to again seat valve 92 and close the exhaust port $l$. This action of the diaphragm structure will ensure the exhaust of an over-charge of pressure from the control chamber 52 when such an over-charge results from an over-charge of pressure in chamber 7.

If the brake cylinder pressure be reduced by leakage the balance of pressures on piston 62 is destroyed and the undisturbed pressure in the control chamber 52 will move the piston 62 and the application valve 17 to application position thereby again uncovering port 63. Air will again flow from the service reservoir to the brake cylinder to supply the pressure lost by leakage.

*Service application position.*

*Empty car braking.*—The empty car braking position of the change-over valve is illustrated in Fig. 4. In this position of the valve section $c'$ of the service reservoir is vented to atmosphere through cavity $106^a$ of the change-over valve and atmospheric port $A^{10}$. Section $c$ of the service reservoir is connected to port 103 by cavity 117 in the change-over valve and port and passage 116 so that in the empty car braking position of the change-over valve section $c$ of the service reservoir will be connected to application valve chamber 16 and will supply the air for braking purposes. Chamber 123 below the diaphragm 124 is vented to atmosphere through passage 122, cavity 130 of the change-over valve, port 131 and atmospheric port $A^{11}$. In this position of the change-over valve port $55^a$ will be connected by cavity 121 of the change-over valve, port and passage 132 of said valve to port and passage 129 which leads to a large pressure governing chamber 128, the upper wall of which is formed by a diaphragm 127, said diaphragm being considerably larger than diaphragm 124, and the chamber 128 being considerably larger than the chamber 123. Chamber 128 is the empty car braking pressure control chamber. Atmospheric pressure being registered on both sides of diaphragm 124 said diaphragm is in-operative in the empty car braking position of the change-over valve. The diaphragm 127 is connected to a lever $j'$ which at its free end is connected to the lower end of the link $k$ so that said diaphragm will move equally with the other diaphragms. Chambers 128 and 52 are in connection with each other through passages 129, 132, port $55^a$ and passages 55 and 51. In the load braking position of the change-over valve the chamber 128 is vented to atmosphere through passage 129, cavity 30 of the change-over valve and atmospheric port $A^{11}$.

Chamber 126 above diaphragm 127 is at all times open to atmosphere, so that there is no pressure at any time in the chambers above the diaphragms 127, 124 and 10.

A service brake pipe reduction will operate the piston 5 and the valve 30 as previously described. Air from chamber 6 will flow through ports 49 and 50, passage 51 to the control chamber 52. It will also flow through passage 55, port $55^a$, cavity 121, port and passage 132, and passage 129 to the pressure governing chamber 128. The combined volumes of chambers 52 and 128 is so proportioned to the volume of pressure in chamber 7 and valve chamber 6 as to give the desired ratio between the brake pipe pressure reduction and control chamber pressure for empty car braking operations (about one to one, or one and one half to one). The volume of chamber 128 is materially larger than that of chamber 123 so that the empty car braking pressure will be considerably lower than the load braking pressure.

The size of passage 129 is proportioned so that the rate of pressure reduction in chamber 6, air flowing to chambers 52 and 128, is equal to the rate of reduction in chamber 2 when a service brake pipe reduction is made. This equal rate of reduction plus the resistance of spring 56 encountered by piston 5 when the latter reaches service position, causes piston 5 and slide valve 30 to stop in service position.

When the pressure in chamber 6 drops slightly below that in chamber 2, piston 5 moves to the right carrying with it graduating valve 48 to service lap position. Graduating valve 48 then covers port 49, preventing further flow of air from chamber 6.

The area of diaphragm 127 is proportioned to the areas of diaphragms 10 and 57 to give the same pressure ratio as exists between the volumes of chamber 7 and chambers 52 and 128.

The pressure accumulated in application chamber 52 from the service operation of valve 30, described above, moves piston 62 to uncover port 63, thus admitting air to the brake cylinder from section c of the service reservoir through passage 105, cavity 117 of valve 101, port 116, passage 102, chamber 16, port 63 and passage 64. Equalization of pressure on the faces of piston 62 cuts off further supply of air to the brake cylinder, and brake cylinder leakage is supplied, as previously described.

If the pressure built up in chamber 128 from a given brake pipe reduction plus the upward force exerted on the diaphragm 10 by the reduced pressure in chamber 9 is less than the downward force exerted on the diaphragm 57 by the undisturbed emergency reservoir pressure in chamber 43 the diaphragms will move downwardly. This downward movement of the diaphragms, because of the link and lever connections, will compress the spring 61$^a$ and hold valve 92$^a$ more firmly to its seat. If the sum of the upward forces on diaphragms 10 and 127 should be greater than the downward force on diaphragm 57 the diaphragms would move upwardly lifting the valve 92$^a$ from its seat and opening the exhaust port $l'$ and thereby permit the escape of air from chamber 128 and from the control chamber 52. Air will continue to exhaust from said chamber until the pressure in chamber 128 is sufficiently reduced to permit the pressure in chamber 43 to move the diaphragms downwardly to again seat valve 92$^a$ and close the exhaust port $l'$. This action of the diaphragm structure will ensure the exhaust of an over-charge of pressure from the control chamber 52 when such an over-charge results from an over-charge of pressure in chamber 7, or otherwise.

When the change-over valve 101 is in empty car braking position, as shown in Fig. 4, the chamber 109 is vented to atmosphere through passage 108, cavity 119 in the change-over valve, port 120 and atmospheric port A$^{12}$. The spring 111 returns the change-over valve from load braking position to empty car braking position whenever the pressure in the system leaks down. This might occur with a car standing on a siding, as fully described in copending application No. 746,570, filed October 29, 1924.

The quick release valves 71 and 74 are operated by the release governing valve stem $m$ in precisely the same manner and for the same purposes as similar valves in copending application No. 754,110, filed December 5, 1924, and need not be specifically described herein. When these valves are open the triple valve will operate in quick release. When they are closed the triple valve will operate in graduated release.

It will be understood that the areas of the governing diaphragms 124 and 127 are important as determining the pressure retained in the control chamber 52. Any excess pressure in either chamber 123 or 128 would open exhaust valve $l$ or $l'$ and permit the excess pressure to blow down to atmosphere. While it is desirable that chamber 128 be larger than chamber 123, it is not necessary provided diaphragm 127 is larger than diaphragm 123.

*Graduated release.*

*Load braking.*—To release after a service application when operating in graduated release the increasing brake pipe pressure in chamber 2 forces piston 5 and slide valve 30 to either normal release or to retarded release, as previously described. In either position, chamber 6 will be recharged. The increasing pressure in chamber 6 will be registered in chamber 9 through passage 11. The upward force on diaphragm 10 plus the upward force on diaphragm 124, exerted by control chamber pressure, becomes greater than the downward force exerted on diaphragm 57. The diaphragms move upwardly opening valve 92 and allowing some air to be vented from chambers 52 and 123 to atmosphere. When the pressure in chambers 123 and 52 is reduced an amount proportional to the increased pressure in chamber 9, the downward force of the undisturbed emergency reservoir pressure on diaphragm 57 will prevail to force the diaphragm downward, thereby closing valve 92. The pressure in chamber 52 is thus reduced an amount proportionate to the amount of increase of pressure in chamber 6. Chamber 52 will be entirely exhausted when chamber 6 is fully recharged to the original pressure or to an equality with the emergency reservoir pressure.

The pressure in chamber 52 having been reduced as described, brake cylinder pressure in chamber 66 will prevail and force piston 62 and valve 17 to the left. Brake cylinder air then escapes through passage 64, port 63, passage 77 of valve 17, passage 78, cavity 79 of valve 30, and port 80 to atmosphere through port A⁶. When the brake cylinder pressure has been reduced slightly below the control chamber pressure the latter pressure will return piston 62 and valve 17 to lap position covering port 63 and stopping the further reduction of brake cylinder pressure. Springs 67 will stop the valve in lap position. The brake cylinder pressure can be reduced in steps as desired.

*Graduated release.*

*Empty car braking.*—With the change-over valve in empty car braking position, graduated release operations will be obtained in a manner precisely similar to that described with the change-over valve in load braking position except that diaphragm 127 will be operative and valve 92ᵃ will control exhaust of pressure from chambers 128 and 52. There will be no pressure in chamber 123 and the operation of the valve 92 will be an idle operation. In load braking operation the valve 92ᵃ will operate, but there will be no pressure in chamber 128.

*Emergency application.*

When an emergency rate of brake pipe reduction is registered in chamber 2, pressure in chamber 6 can not be reduced at an equal rate through passages 49 and 122 in the load braking position of the change-over valve, or through passages 49 and 129 in empty car braking position of said valve, when the main slide valve reaches service position, with the result that the pressure in chamber 6 will drive piston 5 and valve 30 to their extreme position against the resistance of the spring 56. This is the emergency position of the main slide valve and thereafter the emergency operation is precisely as described in application, Serial No. 754,110, and need not be more specifically described herein.

What we claim is:—

1. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, a high brake cylinder pressure governing means subject to brake pipe, emergency reservoir and control chamber pressures and adapted to govern the pressure in the control chamber, a low brake cylinder pressure governing means subject to brake pipe, emergency reservoir and control chamber pressures and adapted to govern the pressure in the control chamber, and manually adjustable means to render either one of said brake cylinder pressure governing means effective and the other ineffective.

2. In a fluid pressure brake the combination with a service reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a high brake cylinder pressure governing means subject to brake pipe, emergency reservoir and control chamber pressures and adapted to govern the pressure in the control chamber, a low brake cylinder pressure governing means subject to brake pipe, emergency reservoir and control chamber pressures and adapted to govern the pressure in the control chamber, and manually adjustable means to render either one of said brake cylinder pressure governing means effective and the other ineffective, the effective brake cylinder pressure governing means operating in response to an increase in the brake pipe pressure to release air from the control chamber in direct proportion to the increase in brake pipe pressure.

3. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a pressure governing means subject to the pressure in the control chamber, and adjustable means to vary the ratio of control chamber pressure produced by a given brake pipe reduction.

4. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a pressure governing means subject to the pressure in the control chamber, and adjustable means to vary the ratio of control chamber pressure produced by a given brake pipe reduction, the pressure governing means operating upon an increase in brake pipe pressure to exhaust air from said control chamber.

5. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, and adjustable means to vary the control chamber pressure produced by a given brake pipe reduction.

6. In a fluid pressure brake the combination with a reservoir, and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a high brake cylinder pressure governing means adapted to govern the pressure in the control chamber, a low brake cylinder pressure governing means adapted to govern the pressure in the control chamber, and manually adjustable means to render either one of said brake cylinder pressure governing means effective and the other ineffective.

7. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a high brake cylinder pressure governing means subject to control chamber pressure and adapted to govern the pressure in the control chamber, a low brake cylinder pressure governing means subject to control chamber pressures and adapted to govern the pressure in the control chamber, and manually adjustable means to render either one of said brake cylinder pressure governing means effective and the other ineffective, the effective brake cylinder pressure governing means operating in response to an increase in the brake pipe pressure to release air from the control chamber in direct proportion to the increase in brake pipe pressure.

8. In a fluid pressure brake the combination with a service reservoir, an emergency reservoir and a brake cylinder, of a main slide valve, a graduating valve, a piston operatively connected to said valves, and subject to the opposing pressures of the brake pipe and a pressure chamber, an application valve governed by the opposing pressures of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a high brake cylinder pressure governing means adapted to govern the pressure in the control chamber, a low brake cylinder pressure governing means adapted to govern the pressure in the control chamber, and manually adjustable means to render either one of said brake cylinder pressure governing means effective and the other ineffective.

9. In a fluid pressure brake the combination with a service reservoir, an emergency reservoir and a brake cylinder, of a main slide valve, a graduating valve, a piston operatively connected to said valves and subject to the opposing pressures of the brake pipe and a pressure chamber, an application valve governed by the opposing pressures of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a pressure governing means subject to brake pipe, emergency reservoir and control chamber pressures and governing the pressure in the control chamber, said pressure governing means operating in response to an increase in brake pipe pressure after a service application of the brakes to open the control chamber to atmosphere, and manually adjustable means interposed between the control chamber and the pressure governing means to vary the pressure built up in the control chamber by a given brake pipe reduction.

10. A triple valve for air brake apparatus comprising an application valve, a control chamber, the pressure in said control chamber moving the application valve to application position, and manually operable means for varying the pressure built up in the control chamber from a given brake pipe reduction.

11. In a fluid pressure brake the combination with a reservoir, and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a high brake cylinder pressure governing chamber of small volume adapted to govern the pressure in the control chamber, a low brake cylinder pressure governing chamber adapted to govern the pressure in the control chamber, and manually adjustable means to connect either one of said brake cylinder pressure governing chambers to the control chamber.

12. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure the said established pressure moving the application valve to application position, a high brake cylinder pressure governing means subject to control chamber pressure and adapted to govern the pressure in the control chamber, a low brake cylinder pressure governing means subject to control chamber pressure and adapted to govern the pressure in the control chamber, and manually adjustable means adapted to connect either one of said brake cylinder pressure governing means to the control chamber.

13. In a fluid pressure brake the combination with a reservoir, and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, a high brake cylinder pressure governing chamber adapted to govern the pressure in the control chamber, a movable abutment subject to the pressure in said high pressure governing chamber, an exhaust valve controlled by the movement of said abutment, a low brake cylinder pressure governing chamber adapted to govern the pressure in the control chamber, a movable abutment subject to the pressure in said low pressure governing chamber, an exhaust valve controlled by the movements of said abutment, the abutment in the low pressure governing chamber being larger in area than the abutment in the high pressure governing chamber, and manually operable means to connect either one of said pressure governing chambers to the control chamber.

14. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure the said established pressure moving the application valve to application position, a high brake cylinder pressure governing means including a small movable abutment subject to control chamber pressure and adapted to govern the pressure in the control chamber, a low brake cylinder pressure governing means including a large movable abutment subject to control chamber pressure and adapted to govern the pressure in the control chamber, and manually operable means adapted to connect either one of said brake cylinder pressure governing means to the control chamber.

In testimony whereof we hereunto affix our signatures.

SPENCER G. NEAL.
WILLIAM ASTLE.
EDWARD P. WILSON.